United States Patent

[11] 3,577,801

| | | |
|---|---|---|
| [72] | Inventor | Louis A. Netta<br>North Brunswick, N.J. |
| [21] | Appl. No. | 852,642 |
| [22] | Filed | Aug. 25, 1969 |
| [45] | Patented | May 4, 1971 |
| [73] | Assignee | Thomas & Betts Corporation<br>Elizabeth, N.J. |

[54] LOCKING DEVICE FOR AN ECCENTRIC MEMBER
5 Claims, 8 Drawing Figs.

[52] U.S. Cl. .................................................. 74/571R
[51] Int. Cl. .................................................. G05g 3/00
[50] Field of Search ........................................ 74/1;
74/571 (R), 568

[56] References Cited
UNITED STATES PATENTS

| 56,631 | 7/1866 | Stiles ........................... | 74/571 |
| 447,386 | 3/1891 | Vuillier ........................ | 74/571 |
| 2,922,599 | 1/1960 | Bigelow ....................... | 74/571 |
| 3,097,543 | 7/1963 | Godsil et al. ................. | 74/568 |

Primary Examiner—William F. O'Dea
Assistant Examiner—Wesley S. Ratliff, Jr.
Attorney—David Teschner ABSTRACT: The eccentric locking device comprises an extension on the eccentric itself, a bushing placed about the aperture into which the eccentric is positioned and means for conjointly engaging the bushing and the extension of the eccentric to prevent relative movement therebetween. In a first embodiment a plurality of cavities is placed about the outer surface of the extension and the inner surface of the bushing. A pin is inserted conjointly in the cavities of both in order to prevent relative movement therebetween. In a further embodiment, the extension terminates in a transverse tab; a cap having a slot therein is then inserted atop the bushing's outer surface and the tab is made to engage the slot to thereby prevent relative motion between the bushing and the eccentric.

Patented May 4, 1971

INVENTOR.
LOUIS A. NETTA
BY

ATTORNEY

INVENTOR.
LOUIS A. NETTA
BY

ATTORNEY

LOCKING DEVICE FOR AN ECCENTRIC MEMBER

BACKGROUND OF THE INVENTION

1. Field of the Invention

The invention is directed to the field of positioning eccentric devices wherein it is necessary to displace an element with respect to another or to cause an element to be displaced along an eccentric path.

2. Description of the Prior Art

In prior art devices, an eccentric device was generally firmly affixed to the shaft which was to carry it. This was done by means of welding an eccentric section to the remaining shaft or by machining in such a manner as to form the eccentric portion and the remaining shaft as a unitary member. When it is necessary, as in tool devices, to have an eccentric which might be repositioned, it is generally found necessary to machine parts of the eccentric surface in order that they match any requirements necessitated by changes of the desired tool operation. Some attempts were made to provide a setscrew to permit repositioning of the eccentric member with respect to its carrying shaft in order to avoid the necessity of remachining the eccentric. However, it has been found that such setscrew types of adjustment will not hold under sufficient load and will cause slipping of the eccentric with respect to the carrying shaft.

SUMMARY OF THE INVENTION

The present invention seeks to overcome the difficulties noted with respect to prior art devices by providing a locking device for an eccentric member which can be adjusted in a plurality of discrete steps and which permits locking in a selected position while retaining the ability to disengage the eccentric and to reposition it, as is desired. This is achieved by novel cooperations between an extension placed upon the eccentric and a locking bushing placed upon the housing, or structural member, in which the eccentric is to operate. In a first embodiment of the invention, the eccentric is provided with an extension for its pilot shaft, which extension is provided with a plurality of cavities in its outer surface, such cavities being uniformly spaced a first predetermined annular displacement from one another. A bushing is then placed within the aperture in which the pilot shaft of the eccentric moves, such bushing being suitably attached to the housing or being made an integral part thereof. A further plurality of cavities having an angular displacement different from that of the angular displacement of the cavities upon the outer surface of the extension is provided on the inner surface of the bushing. A pin is then inserted jointly into one cavity on the inner surface of the bushing and one cavity on the outer surface of the extension. By a careful choice of the number and positioning of the cavities, on both the bushing and the extension, any degree of adjustability is possible, since only a single set of cavities is aligned for any position of the eccentric. A dust cap may then be provided so that the entire locking assembly may be covered. Alternatively, the locking pin may be fabricated as an integral portion of the dust cap.

In a second embodiment of the invention, the eccentric has an extension which terminates in a transverse tab. A cap is then placed upon the outer surface of the bushing, such cap having an internal slot for receipt therein of the transverse tab of the eccentric. When the cap has been properly positioned on the bushing, the transverse tab is permitted to enter the slot of the cap and the eccentric is locked against further relative motion with respect to the bushing. It is therefore an object of this invention to provide a locking mechanism for an eccentric.

It is yet another object of this invention to provide a locking mechanism for an eccentric which permits adjustment of the eccentric over a wide range of positions.

It is still another object of this invention to provide a locking mechanism for an eccentric which can be selectively locked and opened to permit repositioning of the eccentric at will.

It is still another object of this invention to provide a novel eccentric locking mechanism wherein a pin is employed to engage a plurality of cavities on the outer surface of an eccentric extension and the inner surface of a bushing mounted upon a mounting surface whereby relative motion between the eccentric and the bushing is prevented.

It is still another object of this invention to provide a novel eccentric locking mechanism wherein a cap having a slot therein is made to engage with the tab extension of an eccentric to thereby lock the eccentric against relative movement with respect to said bushing.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENTS

Turning now to FIGS. 1 through 4, there is shown a first embodiment of a locking device for an eccentric member 10 constructed in accordance with the concepts of the invention.

Figure 1:
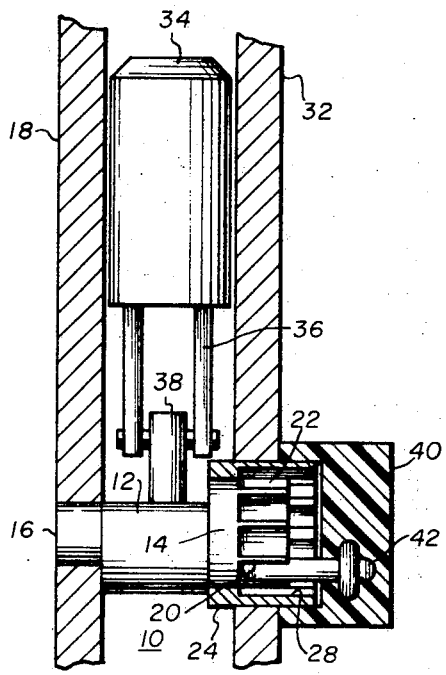
FIG. 1 is a side elevation, partially in section, of a locking device for an eccentric member constructed in accordance with the concepts of the invention and shown installed upon a tool.
Figure 3:
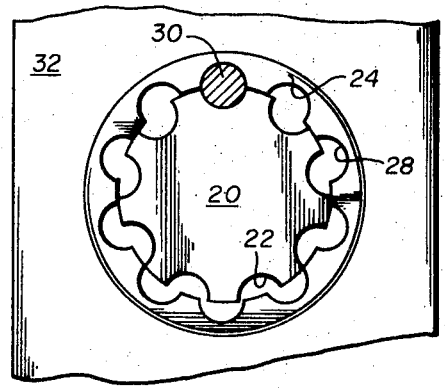
FIG. 3 is a front elevational view of the installed locking device for an eccentric member of FIG. 1 with the cap removed in order to expose the internal details thereof.
Figure 4:
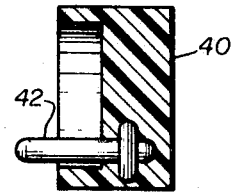
FIG. 4 is a side elevational view, in section, of the cap of the locking device for an eccentric member of FIG. 1.
Figure 2:
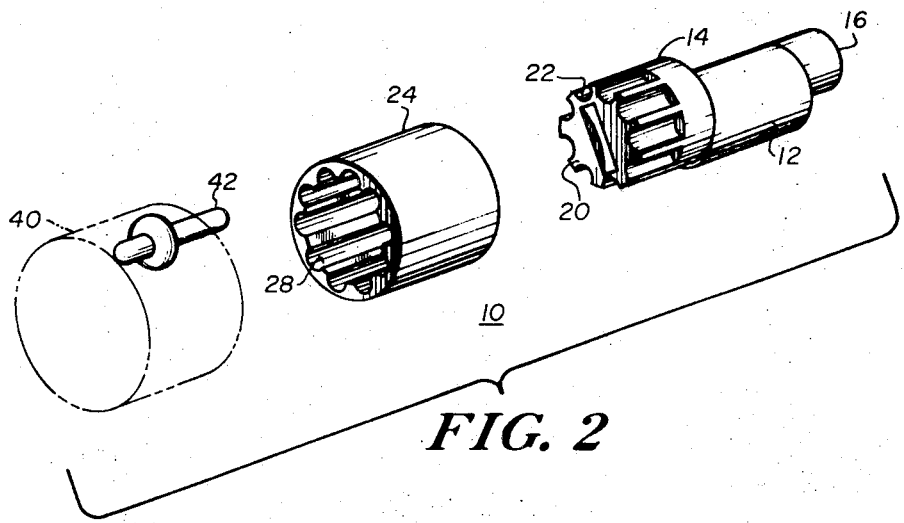
FIG. 2 is a front perspective view, exploded, of the locking device for an eccentric member of FIG. 1.

As is better seen in FIG. 2, eccentric member 12 has attached to one end thereof a first pilot shaft 14 and a second pilot shaft 16, which will bear against the material of the cheek plate about the aperture in the left cheek plate 18 of the tool as shown in FIG. 1. The first pilot shaft 14 has an extension 20 coupled thereto, which has a plurality of cavities 22 equally angularly displaced about the outer periphery of the extension 20. A bushing 24, having outer knurled surface 26, has a plurality of cavities 28 equally angularly displaced about the inner surface thereof. As can be seen in FIG. 3, the number of cavities 28 in the bushing 24 is different than the number of cavities 22 in the extension 20 periphery. As in shown in FIG. 3, there are ten cavities 28 in the bushing 24 and only nine cavities 22 in the extension 20. The extension 20 may be so positioned that only one of the cavities 22 therein will be aligned with a cavity 28 in the bushing 24. A pin 30 will then be employed to lock the extension 20 to the bushing 24. Due to the spacing selected and the number of cavities 28 and 22, a four degree displacement is possible for each aligned position of the cavities 28 and 22. This number is illustrative merely of the technique employed and may be increased or decreased, depending upon the degree of accuracy or refinement desired in the adjustability of the eccentric device.

Turning now to FIG. 1 again, assembly of the locking device for an eccentric member 10 with respect to an illustrative tool is shown. Apertures are placed in the left cheek plate 18 and the right cheek plate 32 of the tool; the eccentric is then positioned so that the eccentric portion 12 is centered between the cheek plates 18 and 32, whereas the second pilot shaft 16 enters the aperture in check plate 18 and the first pilot shaft 14 enters the aperture in the right cheek plate 32. A ram 34 (being driven by means not shown) has links 36 which are coupled to a cam follower 38 therebetween; the cam follower 38 is arranged to ride along the surface of the eccentric 12, and therefore its displacement upwardly is controlled with respect to the contour of the eccentric portion 12.

The aperture in the right cheek plate 32 is of much greater size than the first pilot shaft 14 and permits the introduction therein, about the pilot shaft 14, of the bushing 24. Outer knurled surface 26 (see FIG. 2) is employed to secure the bushing 24 to the right cheek plate 32. If desired, the bushing 24 may be made as an integral portion of the cheek plate 32 or may be brazed thereto, or otherwise attached, if desired. A cap 40 having a locking pin 42 imbedded therein is then placed atop the outer knurled surface 26 of the bushing 24 and locked thereto by means of the outer knurled surface 26 of the bushing 24. The details of the locking cap 40 are better shown in FIG. 4. It should be understood, however, that it is not essential that the locking cap 40 be present as long as a locking pin such as 42 or 30 of FIG. 3 is employed; the cap 40 merely provides a dust shield to prevent the entry of dust and other material within the eccentric mechanism itself. A seal can also be used with cap 40 so that cap 40 may act to deter tampering with the tool setting. Pin 30 may be employed with a separate and distinct cap not having such pin embedded therein, which cap may then be used to seal the entire mechanism.

When at any time it is necessary to readjust the position of the eccentric portion 12, either for different rises desired or to adjust for wear of the component portions, it is only necessary that the cap 40 be removed, disengaging the pin 42 from a cavity 28 of the bushing 24 and a cavity 22 of the extension 20. Then the eccentric section 12 may be rotated so as to align a different pair of cavities 22 and 28, and the pin 42 may then be reapplied in order to lock the locking device for an eccentric member in the desired position.

Figure 5:
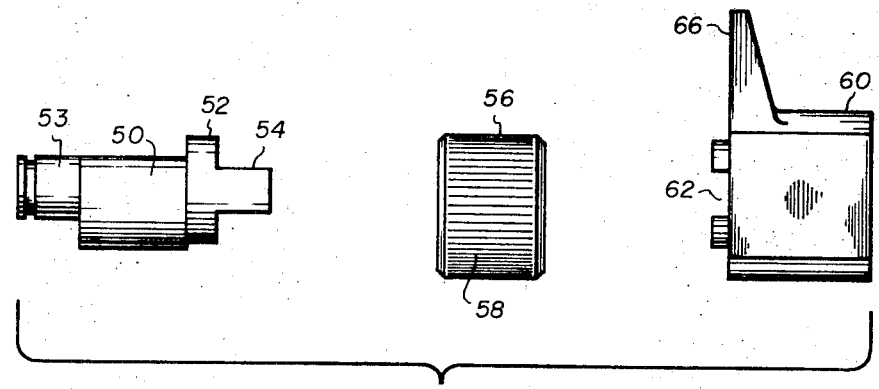
FIG. 5 is a side elevational view, exploded, of a locking device for an eccentric member constructed in accordance with a second embodiment of the invention.
Figure 6:
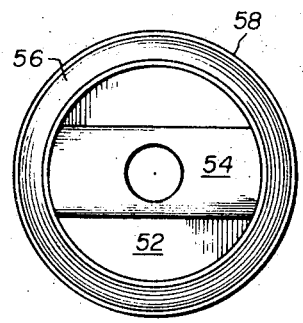
FIG. 6 is a front elevational view showing a partial assembly of the components of FIG. 5.

Referring now to FIGS. 5 through 8, a further embodiment of the locking device for an eccentric member is shown. The eccentric, in this case, is constructed of a central eccentric section 50 having a first pilot shaft 52 and a second pilot shaft 53. Pilot shaft 52 terminates in a transverse tab 54. Bushing 56 has an external knurled surface 58. The assembly of the eccentric with respect to the bushing 56 is shown in FIG. 6. As can be seen from FIG. 6, the internal surface of the bushing 56 is smooth and does not contain any cavities, as was true of the bushing 24 of FIG. 3. A locking cap 60 has a slot 62 therein for receipt of the transverse tab 54. As is better shown in FIG. 7, locking cap 60 has an internal annular recess 64 for receipt therein of the outer surface of the bushing 56. The material of which the locking cap 60 is constructed will be sufficiently soft to permit the knurled outer surface 58 of the bushing 56 to seat itself within the material of the locking cap 60 and prevent relative movement therebetween.

Figure 7:
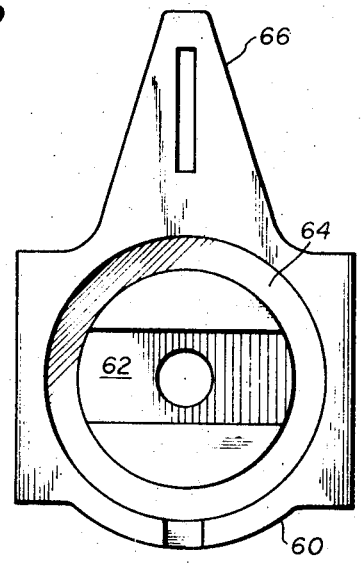
FIG. 7 is a rear elevational view of the locking cap of the locking device for an eccentric member of FIG. 5.
Figure 8:
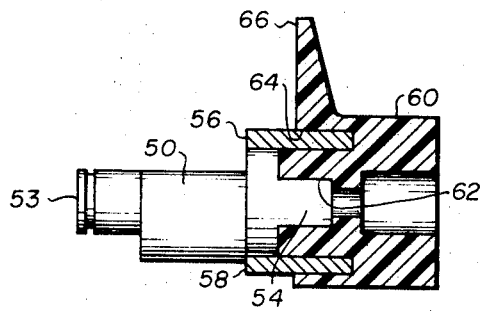
FIG. 8 is a side elevation, in section, of the components of FIG. 5 assembled.

Turning to FIG. 8, the assembly of the locking device of FIGS. 5 through 7 is shown. The eccentric section 52 will be positioned between cheek plates such as 18 and 32 of a tool similar to that shown in FIG. 1. The second pilot shaft 53 will be positioned within an aperture in the left cheek plate 18 as in FIG. 1, whereas the first pilot shaft 52 will be positioned in an aperture in the right cheek plate such as 32 of FIG. 1. Bushing 56 can be positioned about the first pilot shaft 52, employing the outer knurled surface 58 thereof to engage the material of the cheek plate 32 about the aperture. It is also possible to form the bushing 56 as a part of cheek plate 32 itself or to weld, braze or otherwise attach a separate member thereto. Bushing 56 is positioned so that a portion of its outer surface extends beyond the cheek palate 32. The eccentric is then positioned in the desired orientation and the locking cap 60 is then positioned upon the outer surface of the bushing 58 so that the transverse tab 54 is positioned within the slot 62 of the locking cap 60 and the outer edges of the bushing 56 are seated within the recess 64 of the cap 60. In this manner, once the position of the eccentric section 50 has been set, further rotation thereof is not possible. When desired, the locking cap 60 may be removed, eccentric 50 rotated to its desired position, and the cap reinstalled in the manner described above. An indicator 66 is placed on the outer surface of the locking cap 60 to indicate the relative position of the eccentric within the tool; such indicator 66 may be omitted, if desired.

I claim:

1. A locking member for an eccentric having an eccentric shaft positioned intermediate a first and second pilot shaft comprising: an extension coupled to said first pilot shaft; the outer surface of said extension having a plurality of first axially disposed cavities spaced apart from one another about said extension surface by a first angular displacement; a support member; an aperture in said support member proportioned to receive therein said first pilot shaft; a bushing positioned in said aperture about said first pilot shaft; a plurality of second axially disposed cavities about the inner surface of said bushing and spaced apart from one another by a second angular displacement; engaging means jointly engaging one of said first cavities and one of said second cavities to prevent relative movement between said bushing and eccentric; and a cap member proportioned to fit over and at least partially cover said bushing.

2. A locking member for an eccentric having an eccentric shaft positioned intermediate a first and second pilot shaft comprising: an extension coupled to said first pilot shaft; the outer surface of said extension having a plurality of first axially disposed cavities spaced apart from one another about said extension surface by a first angular displacement; a support member; an aperture in said support member proportioned to receive therein said first pilot shaft; a bushing positioned in said aperture about said first pilot shaft; a plurality of second axially disposed cavities about the inner surface of said bushing and spaced apart from one another by a second angular displacement; engaging means jointly engaging one of said first cavities and one of said second cavities to prevent relative movement between said bushing and eccentric; and a cap member proportioned to fit over and at least partially cover said bushing; said cap member being coupled to said engaging means.

3. A locking member for an eccentric having an eccentric shaft positioned intermediate a first and second pilot shaft comprising: an extension coupled to said first pilot shaft; a plurality of first axially disposed cavities spaced apart from one another about said extension surface by a first annular displacement; a support member; an aperture in said support member proportioned to receive therein said first pilot shaft; a bushing positioned in said aperture about said first pilot shaft; knurling in the outer surface of said bushing to fixedly couple said bushing to said support member about said aperture; a plurality of second axially disposed cavities about the inner surface of said bushing and spaced apart from one another by a second angular displacement; engaging means jointly engaging one of said first cavities and one of said second cavities to prevent relative movement between said bushing and said eccentric; and a cap member proportioned to fit over and at least partially cover said bushing; said cap member being coupled to said engaging means.

4. A locking member for an eccentric having an eccentric shaft positioned intermediate a first and second pilot shaft comprising: a transverse tab extension coupled to said first pilot shaft; a support member; an aperture in said support member proportioned to receive therein said first pilot shaft; a bushing positioned in said aperture about said first pilot shaft; knurling in the outer surface of said bushing to fixedly couple said bushing to said support member about said aperture; and cap means to couple said extension to said bushing said cap means proportioned to fit over said bushing and having a slot therein for receipt of said transverse tab extension whereby when said tab is positioned in said slot and said cap is on said bushing rotation of said eccentric with respect to said bushing is prevented.

5. A locking member, as defined in claim 4, further comprising an indicator means on said cap to indicate the position at which said eccentric is locked.